United States Patent
Al-Mufti et al.

(10) Patent No.: US 11,974,314 B2
(45) Date of Patent: Apr. 30, 2024

(54) SYSTEMS AND METHODS FOR DIMINISHING FREQUENCY SPECTRUM CONTENTIONS AMONGST AT LEAST TWO SPECTRUM ACCESS SYSTEMS

(71) Applicant: CommScope Technologies LLC, Hickory, NC (US)

(72) Inventors: Khalid W. Al-Mufti, Sterling, VA (US); Ariful Hannan, Sterling, VA (US)

(73) Assignee: CommScope Technologies LLC, Claremont, NC (US)

( * ) Notice: Subject to any disclaimer, the term of this patent is extended or adjusted under 35 U.S.C. 154(b) by 148 days.

(21) Appl. No.: 17/720,056

(22) Filed: Apr. 13, 2022

(65) Prior Publication Data

US 2023/0007668 A1    Jan. 5, 2023

Related U.S. Application Data

(60) Provisional application No. 63/216,762, filed on Jun. 30, 2021.

(51) Int. Cl.
| | |
|---|---|
| *H04W 52/30* | (2009.01) |
| *H04W 16/14* | (2009.01) |
| *H04W 52/24* | (2009.01) |
| *H04W 72/121* | (2023.01) |
| *H04W 72/542* | (2023.01) |

(52) U.S. Cl.
CPC ......... *H04W 72/542* (2023.01); *H04W 16/14* (2013.01); *H04W 52/243* (2013.01); *H04W 52/30* (2013.01); *H04W 72/121* (2013.01)

(58) Field of Classification Search
CPC . H04W 72/542; H04W 16/14; H04W 52/243; H04W 52/30; H04W 72/121; H04W 52/36
See application file for complete search history.

(56) References Cited

U.S. PATENT DOCUMENTS

| | | | |
|---|---|---|---|
| 8,040,844 B2 * | 10/2011 | Olexa ................ | H04W 72/542 370/329 |
| 10,681,560 B1 * | 6/2020 | Sevindik ............. | H04W 16/14 |
| 10,999,844 B2 * | 5/2021 | Sevindik ........... | H04W 72/0453 |
| 11,451,969 B2 * | 9/2022 | Furuichi .............. | H04W 52/30 |
| 11,617,087 B2 * | 3/2023 | Cimpu ................ | H04W 28/16 370/329 |
| 2006/0263252 A1 * | 11/2006 | Sanchez-Olea .... | G01N 21/6402 422/82.05 |
| 2008/0112360 A1 * | 5/2008 | Seidel .................. | H04W 52/42 370/329 |
| 2009/0088083 A1 * | 4/2009 | Fujii .................. | H04W 52/242 455/63.1 |

(Continued)

OTHER PUBLICATIONS

U.S. Patent and Trademark Office, "Office Action", U.S. Appl. No. 17/703,640, filed Oct. 6, 2023, pp. 1 through 11, Published: US.

(Continued)

*Primary Examiner* — Dominic E Rego
(74) *Attorney, Agent, or Firm* — Fogg & Powers LLC

(57) ABSTRACT

Techniques are provided for diminishing (a) interference at GAA CBSD(s), and/or (b) maximum transmit power(s) of each of one or more GAA CBSD(s) by eliminating contention(s) between one or more pairs of spectrum access systems.

25 Claims, 3 Drawing Sheets

(56) References Cited

U.S. PATENT DOCUMENTS

| | | | |
|---|---|---|---|
| 2010/0330919 A1* | 12/2010 | Gurney | H04W 52/367 |
| | | | 455/67.11 |
| 2015/0092700 A1* | 4/2015 | Li | H04L 43/0829 |
| | | | 370/329 |
| 2015/0119059 A1* | 4/2015 | Miao | H04W 16/14 |
| | | | 455/452.1 |
| 2015/0264135 A1* | 9/2015 | Kandula | H04L 45/121 |
| | | | 709/204 |
| 2016/0004787 A1* | 1/2016 | Shinkuma | G06F 16/9024 |
| | | | 707/798 |
| 2016/0088485 A1* | 3/2016 | Guo | H04W 16/14 |
| | | | 370/329 |
| 2016/0182139 A1* | 6/2016 | Yi | H04W 16/14 |
| | | | 455/11.1 |
| 2017/0208474 A1* | 7/2017 | Mody | G01S 7/003 |
| 2017/0318470 A1 | 11/2017 | Srikanteswara et al. | |
| 2017/0374558 A1* | 12/2017 | Zhao | H04W 16/10 |
| 2018/0139616 A1 | 5/2018 | Khoshnevisan et al. | |
| 2019/0007909 A1 | 1/2019 | Mueck et al. | |
| 2019/0141713 A1 | 5/2019 | Cimpu et al. | |
| 2019/0174359 A1* | 6/2019 | Hannan | H04W 72/53 |
| 2019/0223037 A1 | 7/2019 | Raghothaman | |
| 2020/0053669 A1* | 2/2020 | Hannan | H04W 52/243 |
| 2020/0187133 A1* | 6/2020 | Syed | H04W 52/365 |
| 2020/0351899 A1* | 11/2020 | Sun | H04J 14/02 |
| 2021/0044984 A1* | 2/2021 | Sun | H04W 72/53 |
| 2021/0076223 A1* | 3/2021 | Taneja | H04W 24/08 |
| 2021/0144724 A1 | 5/2021 | Macmullan et al. | |
| 2021/0211880 A1* | 7/2021 | Khawer | H04W 60/06 |
| 2021/0337391 A1 | 10/2021 | Sevindik et al. | |
| 2021/0345121 A1* | 11/2021 | Cimpu | H04W 16/10 |
| 2021/0400498 A1* | 12/2021 | Ioffe | H04W 72/0453 |
| 2022/0095264 A1* | 3/2022 | Cook | H04B 7/18513 |
| 2022/0400487 A1* | 12/2022 | Sevindik | H04W 72/0453 |
| 2023/0012713 A1 | 1/2023 | Khalid et al. | |
| 2023/0071539 A1* | 3/2023 | Dijkstra | H04W 24/02 |
| 2023/0093833 A1* | 3/2023 | Hafeez | H04L 5/1469 |
| | | | 370/329 |

OTHER PUBLICATIONS

Wireless Innovation Forum, "WINNF-SSC-0010, Signaling Protocol and Procedures for Citizens Broadband Radio Service (CBRS): Winnforum Recognized CBRS Grouping Information" V4.2.0, Jun. 30, 2021, p. Title page through 8.

Wireless Innovation Forum, "WINNF-TS-0061, Test and Certification for Citizens Broadband Radio Service (CBRS); Conformance and Performance Test Technical Specifictation; SAS as Unit Unter Test (UUT)", V1.5.1, Oct. 7, 2019, p. Title Page through 180.

Wireless Innovation Forum, WINNF-TS-0112, Requirements for Commercial Operation in the U.S. 3550-3700 MHZ Citizens Broadband Radio Service Band, V1.9.1, Mar. 11, 2020, p. Title page through 76.

Wireless Innovation Forum, "WINNF-TS-0112, Requirements for Commercial Operation in the U.S. 3550-3700 MH Citizens Broadband Radio Service Band" V1.4.1, Jan. 16, 2018, Pp. Title Page through 69.

U.S. Patent and Trademark Office, "Notice of Allowance", U.S. Appl. No. 17/703,640, dated Feb. 5, 2024, pp. 1 through 13, Published: US.

U.S. Patent and Trademark Office, "Office Action", U.S. Appl. No. 17/572,410, dated Mar. 5, 2024, pp. 1 through 20, Published: US.

* cited by examiner

SYSTEMS AND METHODS FOR DIMINISHING FREQUENCY SPECTRUM CONTENTIONS AMONGST AT LEAST TWO SPECTRUM ACCESS SYSTEMS

CROSS-REFERENCE TO RELATED APPLICATIONS

The present application claims benefit of U.S. Patent Application Ser. No. 63/216,762, filed Jun. 30, 2021; the entire contents of the aforementioned patent application are incorporated herein by reference as if set forth in its entirety.

BACKGROUND

A citizens broadband radio service (CBRS) includes incumbent users of shared spectrum and secondary users of shared spectrum. An incumbent user may also be referred to as a primary user or an incumbent. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding interference threshold levels for each of such incumbent user(s) and secondary user(s).

Such secondary users use citizens broadband radio service device(s) (CBSD(s)). A CBSD is a radio including a transmitter coupled to an antenna. A CBRS system may include at least two spectrum access systems (SASs) each of which is operated by different entities. Each SAS regulates the transmissions of certain CBSD(s) in the shared spectrum under the SAS's control, e.g., whether each CBSD of a SAS can transmit in the shared spectrum, and if so, then at what frequency spectrum and power level, to ensure that aggregate interference at incumbent users and other CBSDs is within appropriate limits. The SAS also may include a function to coordinate the shared spectrum usage among secondary users that are General Authorized Access (GAA) CBSDs to diminish interference between GAA CBSDs and to regulate interference from GAA CBSD(s) at certain location(s), e.g., geographic location(s) of incumbent user(s), of protection area(s), and of exclusion zone(s).

SASs operated by different entities may be implemented with different techniques that result in each SAS allocating different frequency spectrums to GAA CBSDs. As a result, a SAS that controls transmission of a GAA CBSD and at least one other SAS that does not control transmission of the GAA CBSD may allocate different frequency spectrums to the GAA CBSD. When this occurs, a contention arises due to different frequency spectrums being allocated by different SASs to the same GAA CBSD. Because of the contention(s), (a) interference is undesirably increased at the same GAA CBSD and/or other GAA CBSD(s), and/or (b) maximum transmit power(s) of each of one or more GAA CBSD(s) is undesirably reduced due to excessive interference at incumbent user(s) and/or geographic region(s) to be maintained interference free.

SUMMARY OF THE INVENTION

A method is performed by a spectrum access system (SAS) to at least one of (a) diminish interference at at least one radio of radios (b) increase maximum transmit power of at least one radio of the radios, and (c) increase transmit bandwidth of at least one radio of the radios. The method comprises: receiving, from another SAS, a unique identifier of each of the radios, a geographic location of each of the radios, co-existence group data of each of the radios, and a frequency spectrum and a maximum transmit power assigned by the other SAS to each of the radios; grouping the radios into nodes based upon the co-existence group data of each of the radios; generating at least one common network graph comprising the nodes; determining a frequency spectrum and a maximum transmit power for each of the radios; sending the determined frequency spectrum and the determined maximum transmit power for each radio to the other SAS; receiving a frequency spectrum and a maximum transmit power, determined by the other SAS, for each of the radios; identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determining if at least one connected set has at least one contention with respect to the other SAS; determining that at least one connected set has at least one contention with respect to the other SAS, then determining whether each contention satisfies at least one acceptance criterion; for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and sending, to the other SAS, data identifying each contention and each contention's connected set, that satisfies the at least one acceptance criterion.

A non-transitory computer readable medium storing a program causing at least one processor of a spectrum access system (SAS) to execute a process to at least one of (a) diminish interference at at least one radio of radios, (b) increase maximum transmit power of at least one radio of the radios, and (c) increase transmit bandwidth of at least one radio of the radios. The process comprises: receiving, from another SAS, a unique identifier of each of the radios, a geographic location of each of the radios, co-existence group data of each of the radios, and a frequency spectrum and a maximum transmit power assigned by the other SAS to each of the radios; grouping the radios into nodes based upon the co-existence group data of each of the radios; generating at least one common network graph comprising the nodes; determining a frequency spectrum and a maximum transmit power for each of the radios; sending the determined frequency spectrum and the determined maximum transmit power for each radio to the other SAS; receiving a frequency spectrum and a maximum transmit power, determined by the other SAS, for each of the radios; identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determining if at least one connected set has at least one contention with respect to the other SAS; determining that at least one connected set of the common network graph has at least one contention with respect to the other SAS, then determining whether each contention satisfies at least one acceptance criterion; for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and sending, to the other SAS, data identifying each contention and each contention's connected set, that satisfies the at least one acceptance criterion.

A spectrum access system (SAS) is provided. The SAS comprises processing circuitry configured to: receive, from another SAS, a unique identifier of each of radios, a geographic location of each of the radios, co-existence group data of each of the radios, and a frequency spectrum and a maximum transmit power assigned by the other SAS to each of the radios; group the radios into nodes based upon the co-existence group data of each of the radios; generate at least one common network graph comprising the nodes; determine a frequency spectrum and a maximum transmit power for each of the radios; causing the determined frequency spectrum and the determined maximum transmit power for each radio to be sent to the other SAS; receive a frequency spectrum and a maximum transmit power, determined by the other SAS, for each of the radios; identify a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determine if at least one connected set has at least one contention with respect to the other SAS; determine that at least one connected set has at least one contention with respect to the other SAS, then determining whether each contention satisfies at least one acceptance criterion; for each contention which satisfies at least one acceptance criterion, adjust the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and cause data identifying each contention and each contention's connected set, that satisfies the at least one acceptance criterion, to be sent to the other SAS.

DRAWINGS

Comprehension of embodiments of the invention is facilitated by reading the following detailed description in conjunction with the annexed drawings, in which.

DETAILED DESCRIPTION

Figure 1A:
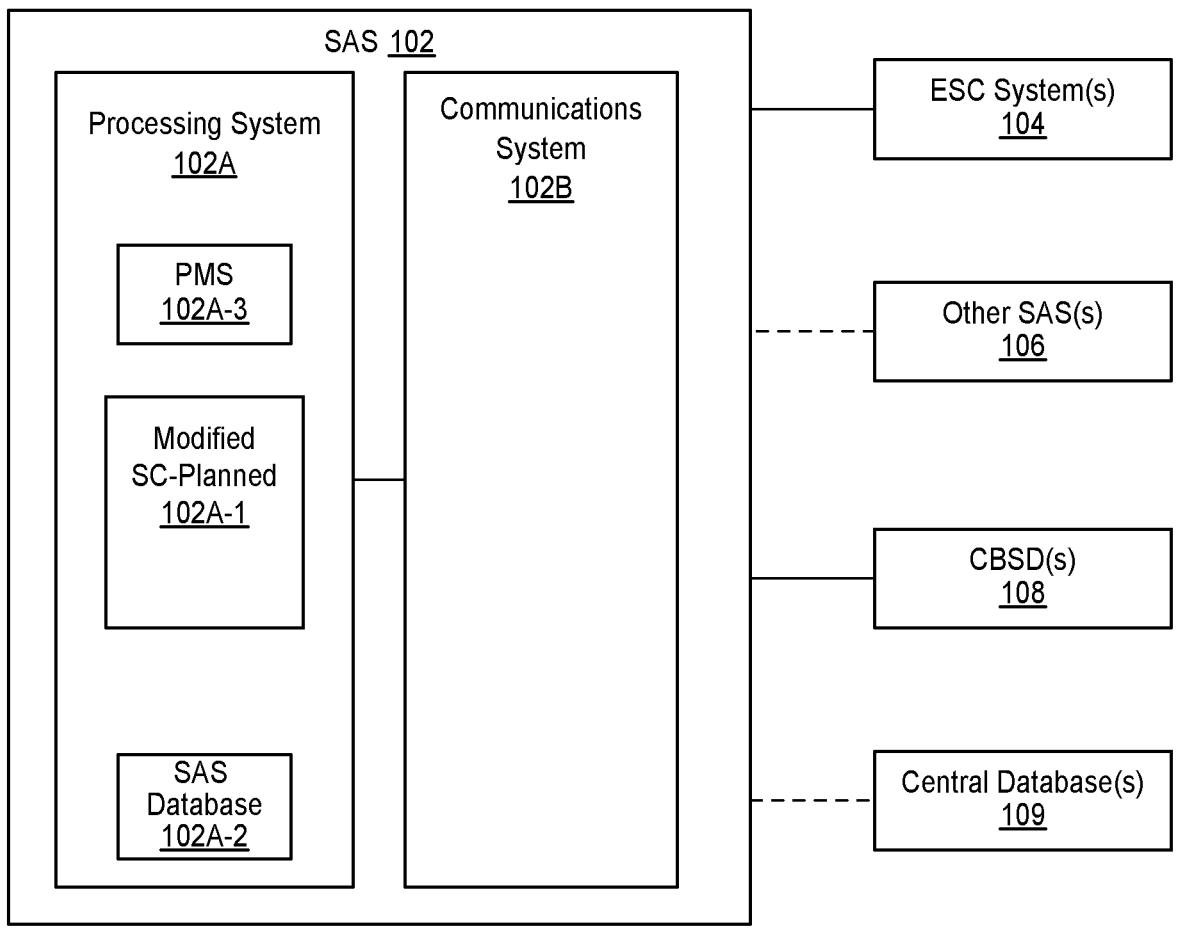
FIG. 1A illustrates a block diagram of one embodiment of a shared spectrum system configured to perform spectrum allocation at a planned time using a modified spectrum coordination system.

Embodiments of the invention implement techniques for diminishing contentions. Thus, (a) interference is desirably reduced at the same GAA CBSD and/or other GAA CBSD(s), and/or (b) maximum transmit power(s) of each of one or more GAA CBSD(s) is desirably increased due to diminished interference at incumbent user(s) and/or geographic region(s) to be maintained interference free.

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Shared spectrum (or shared frequency spectrum) means frequency spectrum utilized by: (a) incumbent user(s) (e.g., a receiver of a fixed satellite service (FSS)) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user.

A protection point means a point representing actual and/or potential incumbent user(s) and/or geographic regions which are to remain free of interference (as that term is defined herein) from CBSDs. Network graph means a connected set where there are no pairs of nodes that are connected with an edge and have the same color. A connected set within a network graph means a unique set of at least two nodes where at least two of the at least two nodes have an edge, or a unique node with no edge to any other node. A network graph is comprised of a connected set of nodes, where each node of the at least two nodes having an edge are assigned different colors, and where a number of colors assigned to nodes of the connected set is a minimum number of colors which can be assigned to each node of the connected set. Optionally, a network graph may alternatively mean the network graph defined above, and further where at least one GAA CBSD (comprising at least one node of each connected set) is geographically located within a neighborhood of a protection point.

Embodiments of an invention provide techniques for diminishing a number of contentions between at least two SASs. A contention arises when two SASs have assigned different frequency spectrums to a color assigned to node(s) of a same connected set. Optionally, each GAA CBSD comprising a node is managed by a single network operator. Optionally, each network operator is assigned a unique color.

A contention between two SASs may be eliminated if the first SAS determines that CBSD(s) (whose transmissions are controlled by the first SAS), comprising either the node(s) assigned the color or the node, have a delta[1] of bandwidth and/or power level that each is less than or equal to a corresponding acceptance threshold level (e.g., an "acceptable bandwidth delta" and "power level delta"). The first SAS seeks to reduce contentions with at least one peer SAS, e.g., the other SAS. If the CBSD(s) (whose transmissions are controlled by the first SAS) have an acceptable bandwidth delta and/or power level delta, then the GAA CBSD(s) are assigned a frequency spectrum determined by the peer SAS. Bandwidth delta may be optionally determined using frequency spectrum (allocated to GAA CBSD(s) by the first SAS) that is not overlapped by other frequency spectrum allocated to other CBSD(s) by a peer SAS.

[1] I.e., a difference between parameters of the first SAS and another SAS, i.e., a peer SAS. Peer SAS means another SAS with which a SAS is attempting to reduce contentions. Thus, the peer SAS is not the first SAS described above.

Co-channel means frequency spectrum equal to or a subset of another frequency spectrum. Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum utilized by a receiver of an incumbent user or a PAL CBSD.

Frequency spectrum means a bandwidth centered about a center frequency. Node means at least one GAA CBSD, where if the node comprises two or more GAA CBSD(s), then each GAA CBSD utilizes the same frequency spectrum and is free of interference (as defined elsewhere herein) from each of the other GAA CBSD(s) comprising the node.

Unless otherwise indicated herein, power as used herein means power or power spectral density. Power levels for a shared spectrum system, such as a CBRS, are often characterized in terms of power spectral density levels. Optionally, power or power spectral density may be a level radiated by antenna(s) electrically coupled to a transmitter of a CBSD and characterized in terms of effective isotropic radiated power (EIRP).

A CBRS system comprises general authorized access (GAA) and/or priority access license (PAL) CBSDs, and incumbent users and geographic region(s) to be maintained free of interference. The incumbent users, such as government users fixed satellite service receiver(s), have priority access, with respect to secondary users such as CBSDs, to some or all of spectrum in the shared spectrum. When satisfying interference requirements, a SAS is configured to grant the CBSDs access to the shared spectrum, including authorizing frequency spectrum (or channels) requested by CBSDs, and authorizing a corresponding requested maximum transmission power or assigning a lower maximum transmission power. The SAS is configured to control the transmission of GAA CBSDs so that PAL CBSDs and the incumbent users are free of interference from GAA CBSDs. The GAA and PAL CBSDs are secondary users; the PAL CBSDs are secondary users because they have a lower priority than incumbent users. For example, PAL and GAA CBSDs have to also protect Environmental Sensing Capability (ESC) sensors which are used to detect radar transmissions, e.g., from naval ships, in the CBRS band. The SAS is also configured to control the transmission of PAL and GAA CBSDs so that incumbent users are free of interference from PAL and GAA CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold interference) is determined. The acceptable level of interference may vary by the type of incumbent user or geographic region, frequency spectrum, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Incumbent users of shared spectrum have first, or highest, priority to utilize the shared spectrum controlled by the SAS. Thus, incumbent users (e.g., the receivers of incumbent users' communications systems such as radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL CBSDs have second (or intermediate) priority, after incumbent users (excluding PAL users), to utilize the frequency spectrum controlled by the SAS. In another embodiment, a PAL user shall be able to operate, when incumbent users (excluding PAL CBSDs) are free of interference of such a PAL user, and free of interference from other PAL CBSDs and general authorized access users. In one embodiment, an ability of a PAL CBSD to operate free of interference shall be limited temporally, geographically, and spectrally within the specifications of its license.

GAA CBSDs have third, or lowest, priority to utilize the frequency spectrum controlled by the SAS. In one embodiment, an operation of GAA CBSDs will be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit when incumbent user(s) and geographic region(s) to be maintained interference free are free of interference when the GAA CBSD transmits.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

FIG. 1A illustrates a block diagram of one embodiment of a shared spectrum system 100 configured to perform spectrum allocation at a planned time using a modified spectrum coordination system. The planned time is when planned spectrum coordination is performed, and may be periodic or aperiodic. The shared spectrum system 100 comprises a SAS configured to permit radios access to share spectrum prior to a planned time (SAS) 102 and communicatively coupled to at least one CBSD (CBSD(s)) 108 whose transmissions are controlled or regulated by the SAS 102. Each CBSD is operated by a general authorized access user and/or a priority access licensee.

Optionally, the SAS 102 is coupled to at least one environmental sensing capability system (ESC system(s)) 104. Optionally, the SAS 102 is coupled to at least one central database (central database(s)) 109, e.g., which has information about (a) incumbent user(s) and/or (b) geographic region(s) to be maintained interference free (e.g., type, interference threshold power level, location, information about neighborhood, and/or when certain incumbent user(s) and/or geographic regions(s) to be maintained interference free are scheduled to receive in the shared spectrum or to include a communications system, e.g., a radar, that will receive in the shared spectrum.

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users.

The SAS 102 is configured to perform interference analysis and authorize transmission by CBSD(s) 108 in the shared spectrum. CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. Alternatively, the shared spectrum system 100 and its PALs and GAA CBSDs, may generate electromagnetic energy that overlaps the geographic region(s) comprising CBSD(s) whose transmissions are controlled by the other SAS(s) 106, and thus must be accounted for by the other SAS(s) 106 when the other SAS(s) 106 perform interference analysis, and authorize operation of CBSDs of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographic region(s).

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the central database(s) 109 which may be coupled to the SAS 102.

The SAS 102 also is also configured to control the operation (e.g., power levels and frequencies of operation) of the GAA user(s)' CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the central database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

The SAS 102, e.g., the processing system 102A, comprises a modified spectrum coordination system (SC-planned or modified SC-planned) 102A-1, and a SAS database 102A-2. The SC-planned 102A-1 is configured to perform planned spectrum coordination, and additionally diminish a number of contentions between at least two SASs. Optionally, the SAS 102 includes a power modelling system (PMS) 102A-3. Optionally, SC-planned 102A-1 is implemented by software stored in the memory circuitry and executed by the processor circuitry, and the SAS database 102A-2 comprises data stored in the memory circuitry and processed by the processor circuitry. The components of the SAS 102 are provided for illustrative purposes only; other component(s) may be used instead of those illustrated in FIG. 1A.

A conventional spectrum coordination system is configured to determine frequency spectrum to allocate to CBSD(s) (registered with a SAS 102 and/or other SAS(s) 106) that ensure that if the CBSD(s) request the frequency spectrum allocation recommended by the SAS 102 and/or the other SAS(s) 106, then the CBSD(s) will be free from interference. Conventional planned spectrum coordination system also determines the maximum transmission power of CBSDs so that protection point(s) (which represents actual and/or potential incumbent user(s) and/or regions which are to remain free of interference from CBSDs) will be free of interference. The conventional planned spectrum coordination system does so by assessing aggregate interference at each protection point having a neighborhood encompassing geographic location(s) of CBSD(s), where the aggregate interference is generated by such CBSD(s) in the neighborhood. Neighborhood means a geographic area (such as a circle or other shape) centered around a protection point, e.g., which optionally is defined by a radius or other geometric description.

Protection points may correspond to different types of incumbent users. An interference threshold level for a protection point may depend on a type of incumbent user that the protection point represents. Interference threshold levels may vary amongst incumbent user types.

Optionally, determination of maximum transmission power may be implemented with power allocation process that operates substantially accordingly to WInnForum general requirement R2-SGN-16 and using an iterative allocation process (IAP). WInnForum general requirement (requirement) R2-SGN-16 of WINNF-TS-0112 defines the IAP, and WINNF-TS-0112 is incorporated by reference herein in its entirety. The IAP determines maximum transmit power levels by allocating interference margin fairly to CBSDs in neighborhood(s) of protection point(s) proximate to the CBSDs. The IAP determines such transmit power levels by allocating interference margin fairly to the CBSDs in neighborhoods of protection point(s) of incumbent(s) for a certain combination or set of frequency spectrums mapped to the CBSDs. WInnForum general requirement (requirement) R2-SGN-16 of WINNF-TS-0112 defines the IAP and is incorporated by reference herein in its entirety. However, the power allocation system may be implemented in other ways to allocate, e.g., equitably, maximum transmission power of CBSDs.

However, as described elsewhere herein, the SC-planned 102A-1 differs from a conventional spectrum coordination system by implementing contention reduction described herein. The PMS 102A-3 is configured to model interference between two geographic points using at least one propagation model and may be used by the SC-planned 102A-1. However, in other embodiments, some or all of the functions provided by the PMS 102A-3 may be integrated into the SC-planned 102A-1. The propagation model(s) may be used to determine path loss between to geographic points; knowing a transmit power of a CBSD in the shared spectrum, the path loss may then be used to determine a power (transmitted from the CBSD) at a geographic location (e.g., at another CBSD or a protection point) remote from the CBSD. Optionally, the PMS 102A-3 includes two or more propagation models one of which may be selected based upon geographic morphology (e.g., topography) between two geographic points. The propagation model(s) may include a free space path loss model, an irregular terrain model and/or a Hata model (or variation(s) thereof such as the enhanced Hata (eHata) model). The PMS 102A-3 may be utilized by the SC-planned 102A-1 to determine interference power transmitted from a CBSD at a geographic location remote from the CBSD.

The SC-planned 102A-1 also includes techniques for generating a neighborhood around each protection point and can utilize the PMS 102A-3 to determine the aggregate level of interference, at each protection point, in frequency spectra at each protection point from CBSD(s) in the neighborhood of the protection point. To this end, the propagation model(s) (e.g., free space path loss model, irregular terrain model and/or Hata model (or variations thereof such as the enhanced Hata (eHata) model)) are used to determine path loss between CBSDs and protection point(s).

The SAS database 102A-2 includes information about the CBSD(s) 108 and CBSDs (geographically proximate to the CBSD(s) 108) whose transmissions in some or all of the shared spectrum are controlled by other SAS(s) 106. Optionally, such CBSD information may include CBSD type (and thus maximum transmit power) and/or maximum transmit power, geographic location, antenna height, antenna gain, antenna pattern, antenna down tilt angle, and/or antenna azimuthal angle. The SAS database 102A-2 also includes information about the location, e.g., representative protection point(s), of incumbent users proximate to the CBSD(s) 108. Additionally, and/or alternatively, the SAS 102 may remotely obtain such information, e.g., from the central database(s) 109, the other SAS(s) 106 (e.g., from a full activity dump (FAD) from each of the other SAS(s) 106 to the SAS 102), and/or the corresponding CBSD(s). The SAS database 102A-2 also includes network graph(s) generated by execution of the SC-planned 102A-1. Each network graph comprises one or more nodes, where each node comprises one or more GAA CBSDs, each node is assigned a color, where if the network graph comprises more than one node then each node is connected to at least one other node by an edge, and where two nodes connected with an edge do not have the same color. The SAS database 102A-2 may also include frequency spectrum allocation information for each color of each node of a network graph generated by SC-planned 102A-1. Optionally, the SAS database 102A-2 may include geographic morphology data about the geographic region where CBSDs whose transmission is controlled by the SAS 102 and optionally by other SAS(s) 106.

Figure 1B:
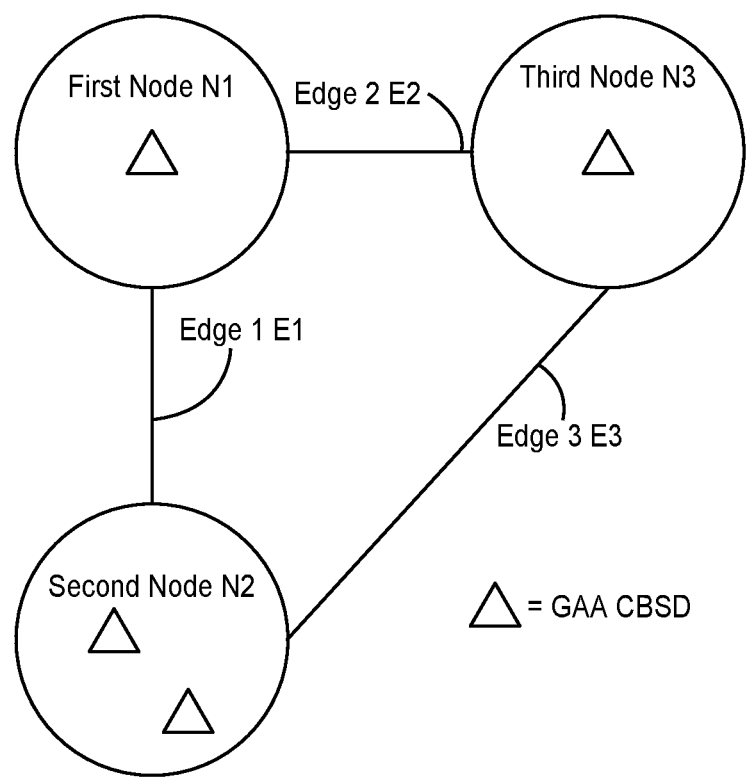
FIG. 1B illustrates a diagram of one embodiment of a connected set.

FIG. 1B illustrates a diagram of one embodiment of a connected set CS1. The connected set CS1 comprises a first node N1, a second node N2, and a third node N3. Each node comprises one or more GAA CBSDs. The first node N1 and the second node N2 are connected by a first interference edge (or first edge) E1. The first node N1 and the third node N3 are connected by a second interference edge, or a second edge, E2. The second node N2 and N3 are connected by a third interference edge, or a third edge, E3. Interference edges, or edges, are described elsewhere herein. Optionally, the connected set CS1 is a common network graph comprising a single connected set.

Figure 2:
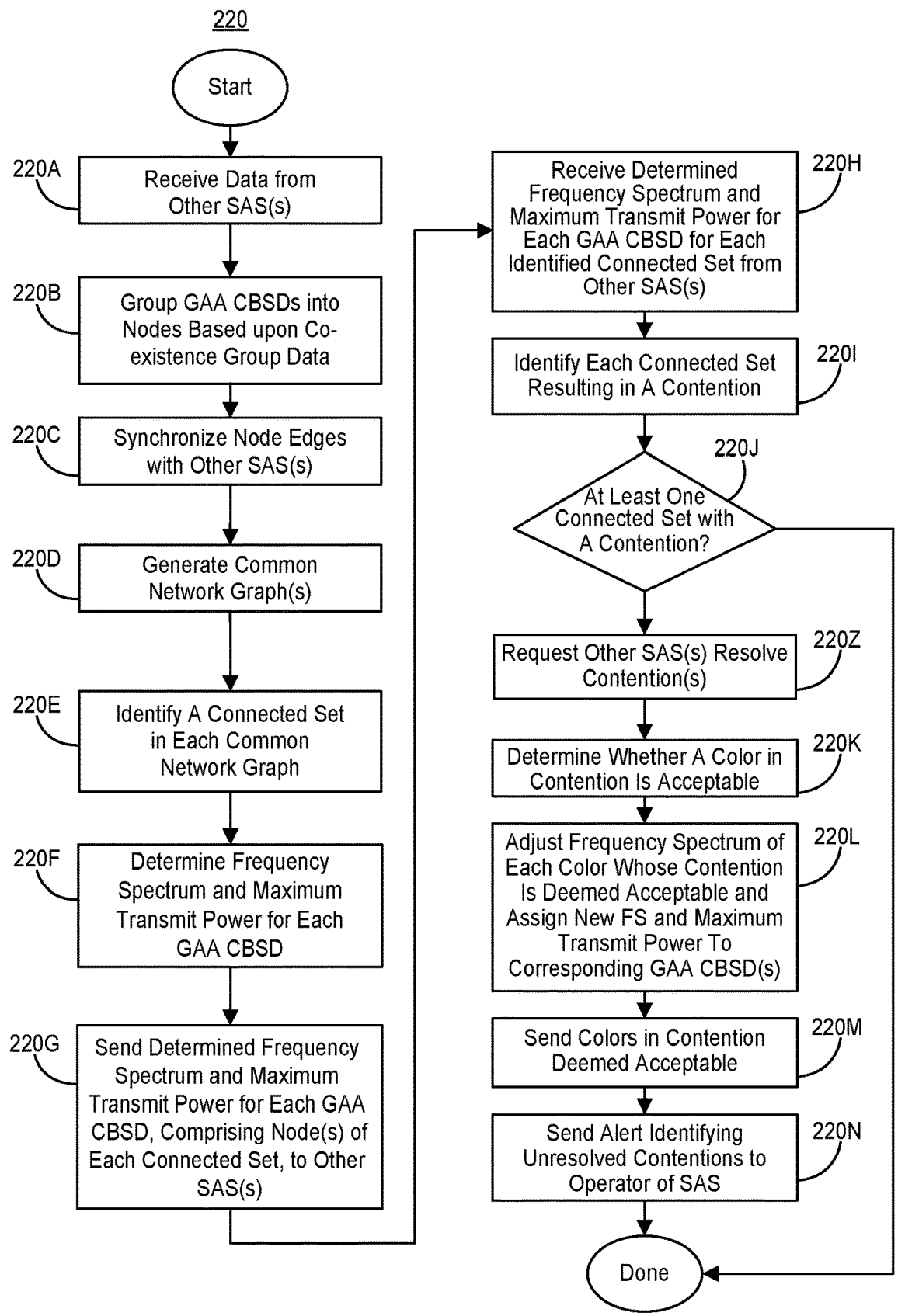
FIG. 2 illustrates a flow diagram of one embodiment of a method for diminishing a number of contentions between at least two spectrum access systems.

FIG. 2 illustrates a flow diagram of one embodiment of a method 220 for diminishing a number of contentions between at least two SASs. To the extent that the methods shown in any Figures are described herein as being implemented with any of the systems illustrated herein, it is to be understood that other embodiments can be implemented in other ways. Optionally, method 220 may be implemented by SAS 102, e.g., by the processing system 102A, and/or by the modified SC planned 102A-1; method 220 is illustrated for pedagogical purpose as being implemented by SAS 102. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Method 220 comprises planned spectrum allocation, e.g., in block 220F. Thus, a SAS 102 determines a frequency spectrum and a maximum transmit power for each GAA CBSD that the SAS 102 analyzes. The GAA CBSD(s) analyzed by the SAS 102 include GAA CBSD(s) whose transmissions are controlled by the SAS, and GAA CBSD(s) whose transmissions are controlled by other SAS(s) 106. The SAS 102 analyzes GAA CBSD(s) controlled by other SAS(s) to ascertain interference at incumbent user(s) and/or geographic region(s) to be maintained interference free, and optionally to ascertain interference at each of the GAA CBSD(s). Method 220 may be used to diminish such contentions.

In block 220A, data is received from at least one of other SAS(s) 106. Optionally, such data may be referred to as full activity dump (FAD) data. The data received from each of the at least one of the other SAS(s) 106 includes a unique identifier of, a geographic location of, co-existence group data for, and frequency spectrum and maximum transmit power assigned to each GAA CBSD analyzed by each SAS of the other SAS(s) 106.

Optionally, co-existence group data (i.e., grouping criteria) may be specified by CBRS Alliance CBRS Coexistence Technical Specifications, CBRSA-TS-2001 V3.1.0 dated 17 Jul. 2020 (which is incorporated herein by reference in its entirety) or Signaling Protocol and Procedures for Citizens Broadband Radio Service (CBRS): WinnForum Recognized CBRS Grouping Information Version 4.1.0 (which is incorporated herein by reference in its entirety). If the WinnForum definition for co-existence group data is used, then co-existence group data means (i) a group type where of two or more GAA CBSDs can be allocated the same frequency spectrum allocation, e.g., Single Frequency Group (SFG) defined by the Signaling Protocol and Procedures for Citizens Broadband Radio Service (CBRS): WinnForum Recognized CBRS Grouping Information Version 4.1.0, and (ii) a group identifier (ID) assigned to the GAA CBSDs comprising such nodes. Optionally, group type and/or group ID are designated by a network operator. A node comprises GAA CBSDs having a SFG group type and the same group ID; e.g., a network operator manages interference amongst the GAA CBSDs comprising a node of SFG group type. An additional coexistence group type is a Spectrum Reuse Group (SRG) defined by Signaling Protocol and Procedures for Citizens Broadband Radio Service (CBRS): WinnForum Recognized CBRS Grouping Information Version 4.1.0. Each GAA CBSD designated as group type SRG comprises its own node. An edge is not formed between two nodes having a SRG group type and a same group ID; e.g., a network operator manages interference amongst the two nodes having a SRG group type and a same group ID. The data received also includes node edge data. The frequency spectrum and maximum transmit power were previously determined and assigned, e.g., during the last planned spectrum allocation or otherwise subsequent to the last planned spectrum allocation. The SAS 102 and at least one of the other SAS(s) 106 may have analyzed one or more of the same GAA CBSD(s). A SAS analyzes, e.g., determines frequency spectrum and maximum transmit power of, GAA CBSDs whose transmission the SAS controls and whose transmission the SAS does not control.

In block 220B, GAA CBSDs are grouped into nodes based upon co-existence group data of each GAA CBSD. Optionally, the SAS receives unique identifier, a geographic location, and/or co-existence group data from each GAA CBSD whose transmission is controlled by the SAS when each GAA CBSD registers with the SAS; however, such information, including co-existence group data, may be otherwise provided, e.g., by central database(s) 109. The GAA CBSDs are grouped into nodes using the co-existence group data received in block 220A, and optionally received during GAA registration or otherwise as described above. The SAS 102 and the other SAS(s) 106 form the same nodes from the same GAA CBSDs.

Optionally, in block 220C, node edges are synchronized with the other SAS(s) 106. A node edge means that a criterion of interference at a GAA CBSD, or a node consisting of one or more GAA CBSDs, exceeds an edge interference threshold level. Optionally, the interference threshold level may be −96 dBm/10 MHz. A node edge represents interference by one of the two GAA CBSDs with the other GAA CBSD, and possibly vice versa. Each GAA CBSD comprises a different node. Node edges are used to form connected sets and network graphs.

If each SAS utilizes a same node edge determination algorithm, then each SAS will generate the same node edges. Thus, node edge synchronization (block 220C) is unnecessary. However, if at least the SAS 102 and/or at least one SAS of the other SAS(s) 106 use different node edge determination algorithms, then node synchronization of block 220C is performed.

Prior to synchronizing nodes, the SAS and the other SAS(s) 106 determine node edges. Then, node edge data is sent from the other SAS(s) 106 (and received by the SAS in block 220A). Node edge data generated by the SAS and the other SAS(s) 106 may comprise an indication of whether an edge has or has not been determined and the criterion of interference of each node edge. The criterion of interference of each node edge may be a power level (or power spectral density level), i.e., an absolute value, or a relative or scaled value which may be referred to as a weight or an edge weight.

The SAS may generate a set of node edges that is not identical to a set of node edges generated by at least one of the other SAS(s) 106; this may be referred to as a node edge "discrepancy". Optionally, the SAS 102 and each of the other SAS(s) 106 use a same algorithm to determine whether a node edge exists or does not exist for each such discrepancy by determining whether an indicium of interference exceeds an indicium of interference threshold value. Optionally, the indicium of interference may be a mean or median of the criterion of interference for each potential node edge where there is a discrepancy. Edge weights and averaging (or taking a mean of) edge weights is described in Winn-Forum document entitled "Operations for Citizens Broadband Radio Service (CBRS); GAA Spectrum Coordination-Approach 1 Technical Report," WINNF-TR-2003, Version 1.0.0 dated 31 May 2019, which is hereby incorporated by reference in its entirety. Optionally and alternatively, the SAS and each of the other SAS(s) 106 may determine whether an edge exists by determining what percentage of SASs have determined that a node edge exists for the discrepancy, and whether that percentage exceeds a threshold level, e.g., fifty percent (or a majority).

In block 220D, at least one common network graph is generated. Common network graph means that an identical network graph (having the same colors assigned to node(s) and edges assigned to node(s) comprising the network graph) is generated at the SAS 102 and each of the other SAS(s) 106. Each SAS utilizes a same algorithm, e.g., a Greedy Coloring Algorithm, to assign a same minimum number of same colors to nodes comprising a connected set comprising the common network graph. The Greedy Coloring algorithm is described at https://www.geeksforgeeks.org/graph-coloring-set-2-greedy-algorithm/, the contents of which are hereby incorporated by reference.

Optionally, in block 220E, a connected set in each common network graph is identified. The set of nodes that comprise a connected set are identical to the nodes that comprise a common network graph, however, the difference between the two is that the common network graph nodes (unlike the nodes of the connected set) have a color assigned to each node, e.g., using the Greedy Coloring Algorithm. Optionally, each SAS is configured to assign a connected set in each common network graph a unique identifier that is the same for each SAS; thus, each connected set may be identified by its unique identifier. Block 220E may not be needed if connected set identifiers are identified by each SAS using the same algorithm for determining connected set identifiers. Optionally, each SAS is also configured assign same identifiers for GAA CBSDs, nodes, and/or colors. Connected set identifier numbering scheme may be based on a number of nodes, and identifiers for each node, comprising the connected set. As an example, the connected set with a largest number of nodes may be designated as connected set (CS) identifier (ID) 1, the connected set with a second largest number of nodes may be designated as connected set identifier 2, and so on. When two or more connected sets have the same number of nodes, then the connected set identifier numbering can be assigned based upon the lowest node identifier number of nodes comprising each connected set having the same number of nodes. The connected set comprising a node with a lowest node identifier number is assigned the next highest connected set identifier number. Each of the other connected sets having the same number of nodes as the connected set comprising the node with the next lowest node identifier is assigned a lower connected set identifier number based upon an order of lowest node identifier number (from lowest to highest node identifier number). Connected set identifier numbering, however, may be performed in different ways. The use of connected set identifiers (which are the same for each SAS) diminishes an amount of data that needs to be communicate between SASs when implementing embodiments of the invention.

In block 220F, planned spectrum allocation is performed by the SAS 102 using the at least one common network graph; that is a frequency spectrum and a maximum transmit power are determined for each GAA CBSD of each connected set of each common network graph comprising each of the node(s) of the common network graphs. Optionally, such a determination may be made on a color-by-color basis or a node-by-node basis, where a color is assigned to each node comprising the common network graph.

In block 220G, the frequency spectrum and the maximum transmission power determined for GAA CBSD, for each connected set, are sent (or transmitted) by the SAS 102 to each of the other SAS(s) 106. Optionally, the frequency spectrum and the maximum transmission power are sent for GAA CBSD(s) on a node by node or color by color basis, where the GAA CBSD(s) comprise a specific node or node(s) assigned a specific color. Because GAA CBSD(s) comprising a specific node or node(s) assigned a specific color have the same frequency spectrum, an amount of data sent between SASs is diminished. To diminish an amount of data sent, a frequency spectrum may be sent for each color assigned to node(s) of each connected set as each GAA CBSD comprising each node assigned a unique color is allocated the same frequency spectrum.

In block 220H, the frequency spectrum and the maximum transmit power determined, by each of the other SAS(s) 106 during planned spectrum allocation, for each GAA CBSD, comprising the node(s) that comprise a connected set of each common network graph are received by the SAS 102. Optionally, such received frequency spectrum(s) and such received maximum transmit power(s) are received from each of the other SAS(s) 106. The received frequency spectrum(s) and the received maximum transmit power(s) are determined by each of the other SAS(s) 106. To diminish an amount of data sent, and thus received, each received frequency spectrum may be sent for each color of each connected set as each GAA CBSD comprising each node assigned a unique color is allocated the same frequency spectrum.

In block 220I, each connected set, of each common network graph with at least one contention is identified with respect to each of the other SAS(s) 106, where each contention of each identified connected set is also identified. Contention means that at least one color assigned to node(s) of a connected set of a common network graph has different frequency spectrum assigned by the SAS 102 and one of the other SAS(s) 106, where the node(s) comprise GAA CBSD(s) whose transmission is controlled by the SAS 102 or by at least one of the other SAS(s) 106. Thus, a connected set in contention means that the connected set comprises node(s) assigned at least one color in contention. A contention can arise for a color assigned to node(s) of a connected set by the SAS 102 and at least one SAS of the other SAS(s) 106. As is discussed elsewhere herein, contentions for at least one color of a connected set are separately analyzed for a pair of SASs (the SAS 102 and one of the other SAS(s) 106). Contentions regarding at least one color of a connected set may be resolved only on such a pair basis. Resolved means that the contention has satisfied at least one acceptance criteria. Thus, resolution of contentions of at least one color of a connected set may be for all or some SASs of the other SAS(s) 106 with respect to the SAS 102.

In block 220J, whether at least one connected set, of a common network graph, has a contention with respect to at least one of the other SAS(s) 106 is determined. If at least one connected set with a contention is identified, then proceed to blocks 220Z or 220K.

In optional block 220Z, contention(s) are sought to be resolved by the other SAS(s) with which the contentions arise. An optional technique for having the other SAS(s) resolve the contentions is subsequently described. For each of the at least one of the other SAS(s) 106 with which the SAS 102 has at least one contention, a request is sent by the SAS 102 to each of the other SAS(s) 106 with which there is a contention. The request seeks to have one of the other SAS(s) 106 resolve each contention with the SAS 102. Each of the other SAS(s) 106 receiving such a request may or may not resolve each contention with the SAS. A contention may be resolved by one of the other SAS(s) 106 by modifying, e.g., the center frequency of, the frequency spectrum assigned to a color in contention. During a time window, e.g., five minutes, the SAS 102 will make such request and await a response from each of the other SAS(s) 106 with which there is at least one contention. If the SAS 102 fails to receive a response indicating a contention is resolved during the time window, the contention will be deemed unresolved. Only contention(s) which are not resolved by the other SAS(s) 106 and received by the SAS 102 in block 220Z during the time window will be sought to be resolved through blocks 220K and 220L. A contention which is resolved by the other SAS(s) 106 may be communicated to the SAS 102 by a message providing the new frequency spectrum assigned to a color, in a connected set, that was in contention but no longer remains in contention.

In block 220K, for each connected set with a contention, for each color in contention of each connected set with a contention, with respect to each SAS of the other SAS(s) 106, whether at least one contention (for a color) is acceptable (i.e., satisfies at least one acceptance criterion) with respect to a SAS of the other SAS(s) 106 giving rise to the color in contention) is determined. For purposes of clarity, one or more of the SAS(s) of the other SAS(s) 106 may have the same color (of a connected set) in contention with the color of the connected set of the SAS 102; however, contentions arise and may be resolved based on a pair of SASs including the SAS 102 and one of the other SAS(s) 106. Optionally, certain frequency spectrum(s) may be more desirable than other frequency spectrum(s) because incumbent users and geographic region(s) to be maintained free of interference need not be free of interference at these certain frequency spectrums(s) and thus GAA CBSD(s) may be able to transmit at higher power levels in these certain frequency spectrums(s). Thus, each of the SAS 102 and SAS(s) of the other SAS(s) 106 may allocate a certain frequency spectrum to GAA CBSD(s) whose transmissions the SAS controls, and to allocate to GAA CBSD(s), whose transmissions are controlled by another SAS, frequency spectrum that is not the certain frequency spectrum and is undesirable. With respect to a contention for a color, the SAS 102 may be willing to accept a frequency spectrum allocated to the color by the SAS of the other SAS(s) 106 giving rise to a contention, if the second SAS of the other SAS(s) 106, and of the SAS are satisfied. If the acceptance criteria of the SAS 102 are satisfied, then the SAS 102 adopts the frequency spectrum allocated to the color by the SAS of the other SAS(s) 106.

Acceptance criteria means at least one function of at least one parameter, where a value each function determined by a value of each of the at least one parameter must be greater than, greater than or equal to, less than, or less than or equal to a user defined threshold value; optionally such parameters may be power, bandwidth, and/or power-bandwidth. Acceptance may be determined by determining whether one or more of each of functions satisfy its corresponding threshold value; thus, not every function may have to satisfy its corresponding threshold value.

If the SAS 102 adopts the frequency spectrum allocated to the color by the SAS of the other SAS(s) 106, then the SAS 102 will send the SAS(s) of the other SAS(s) 106 in indication that the contention the SAS 102 and the SAS of the other SAS(s) 106 has been resolved. Optionally, the SAS 102 sends each SAS of the other SAS(s) 106 the new frequency spectrum to each of the other SAS(s) 106.

Acceptance of a contention between the SAS 102 and a SAS of the other SAS(s) 106 is determined by comparing one or more of each of the following functions with a corresponding threshold value:

(a) a function of delta bandwidth, i.e., a difference or ratio between a bandwidth allocation determined by the SAS 102 and a bandwidth allocation determined by a corresponding SAS of the other SAS(s) 106;

(b) a function of delta maximum transmit power, i.e., a difference or ratio between a maximum transmit power allocation determined by the SAS 102 and a maximum transmit power allocation determined by the corresponding SAS of the other SAS(s) 106; and (c) a function of delta power bandwidth product, i.e., a difference or ratio between a product of maximum transmit power and bandwidth allocation determined by the SAS 102 and a product of maximum transmit power and bandwidth allocation determined by the corresponding SAS of the other SAS(s) 106.

Each function, e.g., for delta maximum transmit power, delta bandwidth, and/or delta power bandwidth product, may have its own function threshold value. Thus, there may delta maximum transmit power threshold value, a delta bandwidth threshold value, and/or a delta power bandwidth product threshold. Optionally, each type of threshold value may be unique and differ from the other threshold value.

Acceptance can be evaluated with weighting to emphasis one or more of the functions of delta bandwidth, delta power, and delta power bandwidth product. Weighting can be achieved by using only one of the functions or by multiplying a threshold corresponding to a function (or the function) by a weight; thus, one or more thresholds (and/or functions) may each be multiplied by a distinct weight. Optionally, if ratios are used for each of delta bandwidth, delta maximum transmit power, and delta power bandwidth product, then a single function and a single threshold can be utilized. The single function comprises a sub-function for delta bandwidth, a sub-function for delta maximum transmit power, and a sub-function for delta power bandwidth product; each of the sub-functions may be weighted differently to emphasize one of the sub-functions. Optionally, each sub-function (weighted or unweighted) may be summed together and compared with the single threshold to determine if acceptance has been achieved.

If a contention with respect to a color (allocated to node(s) of a connected set) between the SAS and a SAS of the other SAS(s) 106 is deemed acceptable, based on satisfying at least one acceptance criterion, then the connected set is no longer deemed to be in contention for that color with respect to the SAS 102 and the SAS of the other SAS(s). If all colors (allocated to nodes of the connected set) in contention are deemed acceptable, then the connect set (which was deemed to be in contention) is no longer deemed to be in contention.

Optionally, the function of delta bandwidth (ABW) may be a relative difference between bandwidths of frequency spectrums (determined by the SAS 102 and determined by one SAS of the other SAS(s) 106) for node(s) (of a connected set) assigned a color in contention. Functions for relative bandwidth are respectively illustrated below. Each such node comprises one or more GAA CBSDs. Mathematically, the function of bandwidth for a color in contention of a connected set in contention may be represented relatively by the following functions:

$$f(\Delta BW) = (BW_{SAS} - BW_{OtherSAS}) \text{ or}$$

$$f(\Delta BW) = \frac{((BW_{SAS} - BW_{OtherSAS})}{BW_{SAS}}$$

where $BW_{SAS}$ mean bandwidth of a frequency spectrum determined by the SAS 102 and where the frequency spectrum is assigned to the color in contention allocated to node(s) of the connected set in contention, and where $BW_{Other\ SAS}$ means bandwidth of a frequency spectrum determined by one of the other SAS(s) 106 and where the frequency spectrum is assigned to the color in contention allocated to node(s) of the connected set in contention.

Optionally, although less efficient, the function of delta bandwidth can be analyzed on a GAA CBSD by GAA CBSD basis for each GAA CBSD comprising each nodes assigned the color in contention. Analysis on a GAA CBSD by GAA CBSD basis is illustrated below for delta maximum transmit power.

Optionally, the function of delta maximum transmit power (e.g., delta EIRP or ΔEIRP) may be a relative difference (e.g., using an average (i.e., a mean) or a maximum of the difference) between a maximum transmit power of frequency spectrum (determined by the SAS 102 and determined by one SAS of the other SAS(s) 106) for node(s) (of a connected set) assigned a color in contention. Maximum transmit power is illustrated as EIRP for pedagogical purposes. Mathematically, the function of delta maximum transmit power may be represented as:

$$f(\Delta EIRP) = \text{mean}(10^{(EIRPi_{peer} - EIRPi_{SAS})/10}) \forall i, \text{ or}$$

$$f(\Delta EIRP) = \max(EIRPi_{peer} - EIRPi_{SAS}) \forall i$$

where each EIRP is in decibels with respect to a reference power level, e.g., dBm, and where each of $EIRPi_{SAS}$ and $EIRPi_{peer}$ means an EIRP determined by the SAS 102, and the other SAS(s) 106, respectively, for an ith GAA CBSD comprising node(s), of the connected set in contention, allocated a color in contention, and where maximum transmit power is illustrated as EIRP for pedagogical purposes. Vi means for all i CBSDs. Optionally, EIRP may be in power spectral density, e.g., decibel milliwatt (dBm) per 1 MHz, or dBm/MHz.

In block 220L, for each contention, i.e., color in contention, determined acceptable (i.e., satisfies one or more of the acceptance criterion), the frequency spectrum assigned to the color is adjusted by the SAS 102 to a new frequency spectrum that is the frequency spectrum assigned to the color by the SAS (of the other SAS(s) 106) with which the contention arose.[2] Further, the new frequency spectrum (FS) and a new maximum transmit power is assigned to each GAA CBSD (comprising node(s) of a color assigned a new frequency spectrum) that was determined for each GAA CBSD by the SAS (of the other SAS(s) 106) for which the contention arose. Optionally, the new maximum transmit power for each such GAA CBSD may be determined with the SAS 102 using IAP. By reducing contentions in this manner, (a) interference is desirably decreased at GAA CBSD(s) comprising node(s) of the common network graph, and/or (b) maximum transmit power(s) of each of one or more the GAA CBSD(s) is desirably increased due. In an event where all contentions are eliminated, then (a) interference is desirably minimized at at least one the GAA CBSD (b) maximum transmit power(s) of at least one of the GAA CBSD(s) is maximized, and/or (c) transmit bandwidth of at least one of the GAA CBSD is increased, e.g., maximized. If contentions for a color are deemed acceptable with respect to the SAS 102 and more than one SAS (of the other SAS(s) 106), then select the frequency spectrum assigned by a SAS (of the other SAS(s) 106) for which a contention arose based upon the following. For each SAS (of the other SAS(s) 106) for which a contention arose, determine a total function comprising the function of bandwidth optionally summed with the function of maximum transmit power. Optionally, unique weights may be multiplied with each function before they are summed; optionally, each weight has a value from zero to one. The frequency spectrum is selected from the SAS (of the other SAS(s) 106 and for which a contention arose) having a total function with the largest numerical value. Optionally, at least one radio, whose transmission is controlled by the SAS and comprises a node assigned a color whose contention was resolve, is configured to transmit on the new frequency spectrum and at the new maximum transmit power.

[2] By determining a new frequency spectrum assigned to a color in contention for the SAS 102, SAS 102 may relinquish more desirable frequency spectrum which can be utilized by GAA CBSD(s) whose transmission is controlled by the other SAS(s) 106. This would arise if the acceptance criteria is met for less desirable frequency spectrum.

In block 220M, an indication of colors in contention deemed acceptable (i.e., an indication of colors having satisfied each acceptance criteria and thus no longer in contention with a certain SAS(s) of the other SAS(s) 106), on a connected set by connected set basis, are sent (or transmitted) to at least the SAS(s) of the other SAS(s) 106 with which the contention(s) arose, and optionally to all SAS(s) of the other SAS(s) 106. Optionally, on a connected set by connected set basis, new frequency spectrum assigned to each color by the SAS 102 to resolve a color in contention are sent to the SAS of the other SAS(s) with which the contention was resolved; optionally, the new frequency spectrum is sent to all SASs of the other SAS(s) 106. If for a SAS of the other SAS(s) 106 resulting in a connected set in contention with the SAS 102, all colors in contention are deemed acceptable, then the connected set in contention, comprising nodes allocated the colors in contention, is deemed acceptable and no longer in contention. Optionally, in block 220N, an alert identifying each remaining contention, is sent (or transmitted) to an operator of the SAS 102 so that the operator can consider how to resolve such contentions with operator(s) of the other SAS(s) 106.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXEMPLARY EMBODIMENTS

Example 1 includes a method performed by a spectrum access system (SAS) to at least one of (a) diminish interference at at least one radio of radios (b) increase maximum transmit power of at least one radio of the radios, and (c) increase transmit bandwidth of at least one radio of the radios, the method comprising: receiving, from another SAS, a unique identifier of each of the radios, a geographic location of each of the radios, co-existence group data of each of the radios, and a frequency spectrum and a maximum transmit power assigned by the other SAS to each of the radios; grouping the radios into nodes based upon the co-existence group data of each of the radios; generating at least one common network graph comprising the nodes; determining a frequency spectrum and a maximum transmit power for each of the radios; sending the determined frequency spectrum and the determined maximum transmit power for each radio to the other SAS; receiving a frequency spectrum and a maximum transmit power, determined by the other SAS, for each of the radios; identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determining if at least one connected set has at least one contention with respect to the other SAS; determining that at least one connected set has at least one contention with respect to the other SAS, then determining whether each contention satisfies at least one acceptance criterion; for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and sending, to the other SAS, data identifying each contention and each contention's connected set, that satisfies the at least one acceptance criterion.

Example 2 includes the method of Example 1, further comprising synchronizing node edges with the other SAS.

Example 3 includes the method of any of Examples 1-2, further comprising identifying the connected set in the common network graph.

Example 4 includes the method of any of Examples 1-3, further comprising requesting the other SAS to resolve each contention; and wherein determining whether each contention satisfies the at least one acceptance criterion comprises determining whether each unresolved contention satisfies the at least one acceptance criterion; wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

Example 5 includes the method of any of Examples 1-4, further comprising sending an alert, to an operator of the SAS, identifying each remaining contention and each contention's connected set.

Example 6 includes the method of any of Examples 1-5, wherein each acceptance criterion is a function of at least one of bandwidth, maximum transmit power, and power bandwidth product.

Example 7 includes the method of any of Examples 1-6, further comprising sending, to the other SAS, the new frequency spectrum assigned for each contention which satisfies each acceptance criterion.

Example 8 includes the method of any of Examples 1-7, wherein at least one radio, whose transmission is controlled by the SAS and comprises a node assigned a color whose contention was resolved, is configured to transmit on the new frequency spectrum and at the new maximum transmit power.

Example 9 includes a non-transitory computer readable medium storing a program causing at least one processor of a spectrum access system (SAS) to execute a process to at least one of (a) diminish interference at at least one radio of radios, (b) increase maximum transmit power of at least one radio of the radios, and (c) increase transmit bandwidth of at least one radio of the radios, the process comprising: receiving, from another SAS, a unique identifier of each of the radios, a geographic location of each of the radios, co-existence group data of each of the radios, and a frequency spectrum and a maximum transmit power assigned by the other SAS to each of the radios; grouping the radios into nodes based upon the co-existence group data of each of the radios; generating at least one common network graph comprising the nodes; determining a frequency spectrum and a maximum transmit power for each of the radios; sending the determined frequency spectrum and the determined maximum transmit power for each radio to the other SAS; receiving a frequency spectrum and a maximum transmit power, determined by the other SAS, for each of the radios; identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determining if at least one connected set has at least one contention with respect to the other SAS; determining that at least one connected set of the common network graph has at least one contention with respect to the other SAS, then determining whether each contention satisfies at least one acceptance criterion; for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and sending, to the other SAS, data identifying each contention and each contention's connected set, that satisfies the at least one acceptance criterion.

Example 10 includes the non-transitory computer readable medium of Example 9, the process further comprising synchronizing node edges with the other SAS.

Example 11 includes the non-transitory computer readable medium of any of Examples 9-10, the process further comprising identifying the connected set in the common network graph.

Example 12 includes the non-transitory computer readable medium of any of Examples 9-11, the process further comprising requesting the other SAS to resolve each contention; and wherein determining whether each contention satisfies the at least one acceptance criterion comprises determining whether each unresolved contention satisfies the at least one acceptance criterion; wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

Example 13 includes the non-transitory computer readable medium of any of Examples 9-12, the process further comprising sending an alert, to the operator of the SAS, identifying each remaining contention and each contention's connected set.

Example 14 includes the non-transitory computer readable medium of any of Examples 9-13, wherein each acceptance criterion is a function of at least one of bandwidth, maximum transmit power, and power bandwidth product.

Example 15 includes the non-transitory computer readable medium of any of Examples 9-14, the process further comprising sending, to the other SAS, the new frequency spectrum assigned for each contention which satisfies each acceptance criterion.

Example 16 includes the non-transitory computer readable medium of any of Examples 9-15, wherein at least one radio, whose transmission is controlled by the SAS and comprises a node assigned a color whose contention was resolved, is configured to transmit on the new frequency spectrum and at the new maximum transmit power.

Example 17 includes a spectrum access system (SAS) comprising processing circuitry configured to: receive, from another SAS, a unique identifier of each of radios, a geographic location of each of the radios, co-existence group data of each of the radios, and a frequency spectrum and a maximum transmit power assigned by the other SAS to each of the radios; group the radios into nodes based upon the co-existence group data of each of the radios; generate at least one common network graph comprising the nodes; determine a frequency spectrum and a maximum transmit power for each of the radios; causing the determined frequency spectrum and the determined maximum transmit power for each radio to be sent to the other SAS; receive a frequency spectrum and a maximum transmit power, determined by the other SAS, for each of the radios; identify a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS; determine if at least one connected set has at least one contention with respect to the other SAS; determine that at least one connected set has at least one contention with respect to the other SAS, then determining whether each contention satisfies at least one acceptance criterion; for each contention which satisfies at least one acceptance criterion, adjust the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and cause data identifying each contention and each contention's connected set, that satisfies the at least one acceptance criterion, to be sent to the other SAS.

Example 18 includes the SAS of Example 17, wherein the processing circuitry is further configured to synchronize node edges with the other SAS.

Example 19 includes the SAS of any of Examples 17-18, wherein the processing circuitry is further configured to identify the connected set in the common network graph.

Example 20 includes the SAS of any of Examples 17-19, wherein the processing circuitry is further configured to cause a request to be sent the other SAS to resolve each contention; and wherein determining whether each contention satisfies the at least one acceptance criterion comprises determining whether each unresolved contention satisfies the at least one acceptance criterion; wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

Example 21 includes the SAS of any of Examples 17-20, wherein the processing circuitry is further configured to cause an alert, identifying each remaining contention and each contention's connected set, to be transmitted to the operator of the SAS.

Example 22 includes the SAS of any of Examples 17-21, wherein each acceptance criterion is a function of at least one of bandwidth, maximum transmit power, and power bandwidth product.

Example 23 includes the SAS of any of Examples 17-22, wherein the processing circuitry is further configured to cause the new frequency spectrum assigned for each contention which satisfies each acceptance criterion to be sent to the other SAS.

Example 24 includes the SAS of Examples 17-23, wherein at least one radio, whose transmission is controlled by the SAS and comprises a node assigned a color whose contention was resolved, is configured to transmit on the new frequency spectrum and at the new maximum transmit power.

Example 25 includes the SAS of any of Examples 17-24, further comprising a communications system communicatively coupled to the processing circuitry.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method performed by a spectrum access system (SAS) to at least one of (a) diminish interference at at least one radio of radios (b) increase maximum transmit power of at least one radio of the radios, and (c) increase transmit bandwidth of at least one radio of the radios, the method comprising:
   receiving, from another SAS, a unique identifier of each of the radios, a geographic location of each of the radios, co-existence group data of each of the radios, and a frequency spectrum and a maximum transmit power assigned by the other SAS to each of the radios;
   grouping the radios into nodes based upon the co-existence group data of each of the radios;
   generating at least one common network graph comprising the nodes;
   determining a frequency spectrum and a maximum transmit power for each of the radios;
   sending the determined frequency spectrum and the determined maximum transmit power for each radio to the other SAS;
   receiving a frequency spectrum and a maximum transmit power, determined by the other SAS, for each of the radios;
   identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS;
   determining if at least one connected set has at least one contention with respect to the other SAS;
   determining that at least one connected set has at least one contention with respect to the other SAS, then determining whether each contention satisfies at least one acceptance criterion;
   for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and
   sending, to the other SAS, data identifying each contention and each contention's connected set, that satisfies the at least one acceptance criterion.

2. The method of claim 1, further comprising synchronizing node edges with the other SAS.

3. The method of claim 1, further comprising identifying the connected set in the common network graph.

4. The method of claim 1, further comprising requesting the other SAS to resolve each contention; and wherein determining whether each contention satisfies the at least one acceptance criterion comprises determining whether each unresolved contention satisfies the at least one acceptance criterion;

wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

5. The method of claim 1, further comprising sending an alert, to an operator of the SAS, identifying each remaining contention and each contention's connected set.

6. The method of claim 1, wherein each acceptance criterion is a function of at least one of bandwidth, maximum transmit power, and power bandwidth product.

7. The method of claim 1, further comprising sending, to the other SAS, the new frequency spectrum assigned for each contention which satisfies each acceptance criterion.

8. The method of claim 1, wherein at least one radio, whose transmission is controlled by the SAS and comprises a node assigned a color whose contention was resolved, is configured to transmit on the new frequency spectrum and at the new maximum transmit power.

9. A non-transitory computer readable medium storing a program causing at least one processor of a spectrum access system (SAS) to execute a process to at least one of (a) diminish interference at at least one radio of radios, (b) increase maximum transmit power of at least one radio of the radios, and (c) increase transmit bandwidth of at least one radio of the radios, the process comprising:

receiving, from another SAS, a unique identifier of each of the radios, a geographic location of each of the radios, co-existence group data of each of the radios, and a frequency spectrum and a maximum transmit power assigned by the other SAS to each of the radios;

grouping the radios into nodes based upon the co-existence group data of each of the radios;

generating at least one common network graph comprising the nodes;

determining a frequency spectrum and a maximum transmit power for each of the radios;

sending the determined frequency spectrum and the determined maximum transmit power for each radio to the other SAS;

receiving a frequency spectrum and a maximum transmit power, determined by the other SAS, for each of the radios;

identifying a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS;

determining if at least one connected set has at least one contention with respect to the other SAS;

determining that at least one connected set of the common network graph has at least one contention with respect to the other SAS, then determining whether each contention satisfies at least one acceptance criterion;

for each contention which satisfies at least one acceptance criterion, adjusting the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and sending, to the other SAS, data identifying each contention and each contention's connected set, that satisfies the at least one acceptance criterion.

10. The non-transitory computer readable medium of claim 9, the process further comprising synchronizing node edges with the other SAS.

11. The non-transitory computer readable medium of claim 9, the process further comprising identifying the connected set in the common network graph.

12. The non-transitory computer readable medium of claim 9, the process further comprising requesting the other SAS to resolve each contention; and wherein determining whether each contention satisfies the at least one acceptance criterion comprises determining whether each unresolved contention satisfies the at least one acceptance criterion;

wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

13. The non-transitory computer readable medium of claim 9, the process further comprising sending an alert, to the operator of the SAS, identifying each remaining contention and each contention's connected set.

14. The non-transitory computer readable medium of claim 9, wherein each acceptance criterion is a function of at least one of bandwidth, maximum transmit power, and power bandwidth product.

15. The non-transitory computer readable medium of claim 9, the process further comprising sending, to the other SAS, the new frequency spectrum assigned for each contention which satisfies each acceptance criterion.

16. The non-transitory computer readable medium of claim 9, wherein at least one radio, whose transmission is controlled by the SAS and comprises a node assigned a color whose contention was resolved, is configured to transmit on the new frequency spectrum and at the new maximum transmit power.

17. A spectrum access system (SAS) comprising processing circuitry configured to:
receive, from another SAS, a unique identifier of each of radios, a geographic location of each of the radios, co-existence group data of each of the radios, and a frequency spectrum and a maximum transmit power assigned by the other SAS to each of the radios;
group the radios into nodes based upon the co-existence group data of each of the radios;
generate at least one common network graph comprising the nodes;
determine a frequency spectrum and a maximum transmit power for each of the radios;
causing the determined frequency spectrum and the determined maximum transmit power for each radio to be sent to the other SAS;
receive a frequency spectrum and a maximum transmit power, determined by the other SAS, for each of the radios;
identify a connected set of each common network graph with at least one contention with respect to the other SAS, wherein each contention of each identified connected set is also identified, and wherein contention means that at least one color assigned to at least one node of a connected set of a common network graph has different frequency spectrum assigned by the SAS and by the other SAS, wherein each of the at least one node comprises at least one radio whose transmission is controlled by the SAS or the other SAS;
determine if at least one connected set has at least one contention with respect to the other SAS;
determine that at least one connected set has at least one contention with respect to the other SAS, then determining whether each contention satisfies at least one acceptance criterion;
for each contention which satisfies at least one acceptance criterion, adjust the determined frequency spectrum to a new frequency spectrum that is the received frequency spectrum, and assigning the new frequency spectrum and a new maximum transmit power to each radio comprising each node assigned a color whose contention satisfies the at least one acceptance criterion; and
cause data identifying each contention and each contention's connected set, that satisfies the at least one acceptance criterion, to be sent to the other SAS.

18. The SAS of claim 17, wherein the processing circuitry is further configured to synchronize node edges with the other SAS.

19. The SAS of claim 17, wherein the processing circuitry is further configured to identify the connected set in the common network graph.

20. The SAS of claim 17, wherein the processing circuitry is further configured to cause a request to be sent the other SAS to resolve each contention; and
wherein determining whether each contention satisfies the at least one acceptance criterion comprises determining whether each unresolved contention satisfies the at least one acceptance criterion;
wherein for each contention which satisfies the at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion comprises for each unresolved contention which satisfies at least one acceptance criterion, adjusting the determined frequency spectrum to the new frequency spectrum that is the received frequency spectrum, and assigning the new frequency spectrum and the new maximum transmit power to each radio comprising each node assigned a color whose contention satisfies the at least one acceptance criterion.

21. The SAS of claim 17, wherein the processing circuitry is further configured to cause an alert, identifying each remaining contention and each contention's connected set, to be transmitted to the operator of the SAS.

22. The SAS of claim 17, wherein each acceptance criterion is a function of at least one of bandwidth, maximum transmit power, and power bandwidth product.

23. The SAS of claim 17, wherein the processing circuitry is further configured to cause the new frequency spectrum assigned for each contention which satisfies each acceptance criterion to be sent to the other SAS.

24. The SAS of claim 17, wherein at least one radio, whose transmission is controlled by the SAS and comprises a node assigned a color whose contention was resolved, is configured to transmit on the new frequency spectrum and at the new maximum transmit power.

25. The SAS of claim 17, further comprising a communications system communicatively coupled to the processing circuitry.

* * * * *